INVENTOR.
JOHN G. ZIEGLER
BY D. Clyde Jones
ATTORNEY

Patented Nov. 27, 1951

2,576,496

UNITED STATES PATENT OFFICE 2,576,496

METHOD FOR CONTROLLING MULTIPLE-EFFECT EVAPORATORS

John G. Ziegler, Walnut Creek, Calif., assignor to Taylor Instrument Companies, Rochester, N. Y., a corporation of New York Application July 31, 1947, Serial No. 764,968

2 Claims. (Cl. 159—47)

1

This invention relates to a method of and to apparatus for controlling multiple-effect sugar juice evaporators.

In the concentration of sugar juice in a multiple-effect evaporator it is desirable to utilize the resulting hot vapors or steam in various sugar plant equipment that require steam at a predetermined pressure. Although the operation of the evaporator is continuous, the supply of raw juice or liquor varies within wide limits while the concentrated juice is preferably discharged from the evaporator at a given specific gravity.

These several requirements have necessitated the constant supervision of an attendant at the evaporator whose duty it was to make adjustments in the apparatus associated with an evaporator to compensate for the changing conditions. These adjustments were made to effect proper operation of the evaporator and also to supply the desired vapors or low pressure steam to various utilization loads.

In accordance with the novel method of this invention, a supply of juice to the evaporator, which supply may be inadequate at times to produce the required low pressure steam in the evaporator, is supplemented by the addition of water, while an excessive supply is effective to increase the evaporation rate in the evaporator so that the juice storage facilities are not overtaxed. Thus a supply of juice that varies within wide limits can be concentrated in the evaporator and yet low pressure steam or vapors at a given pressure or pressures can be produced by the evaporation taking place in the evaporator.

In accordance with the novel control system of the present invention, means responsive to the quantity of juice to be evaporated controls the evaporation rate in a multi-effect evaporator, as well as other means maintains a predetermined pressure or pressures in by-product vapors or low pressure steam generated by evaporation in the evaporator and this supply provides means for supplementing the juice supply in the event that this supply drops below a predetermined minimum.

Figure 1:
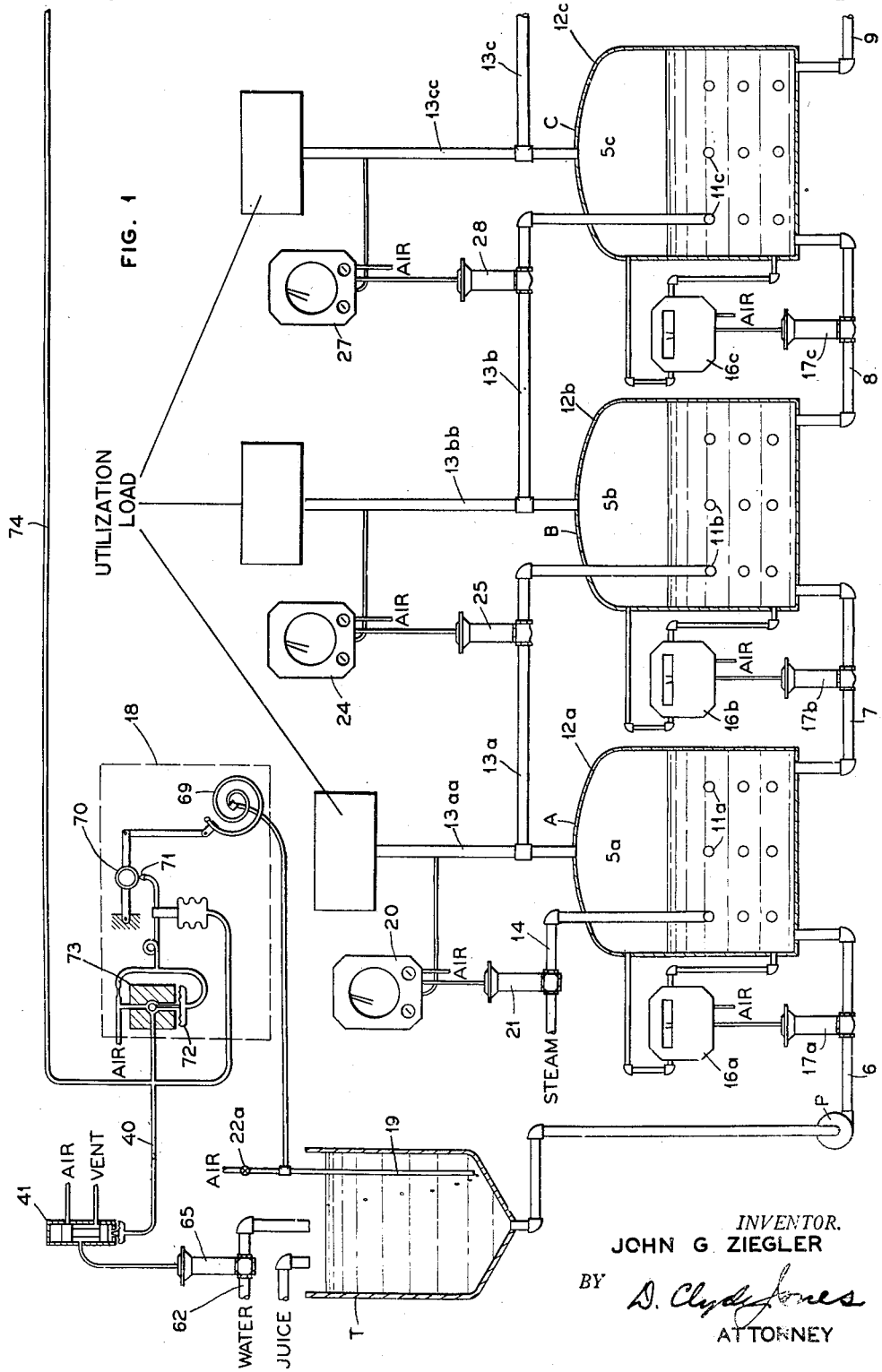
Figure 2:
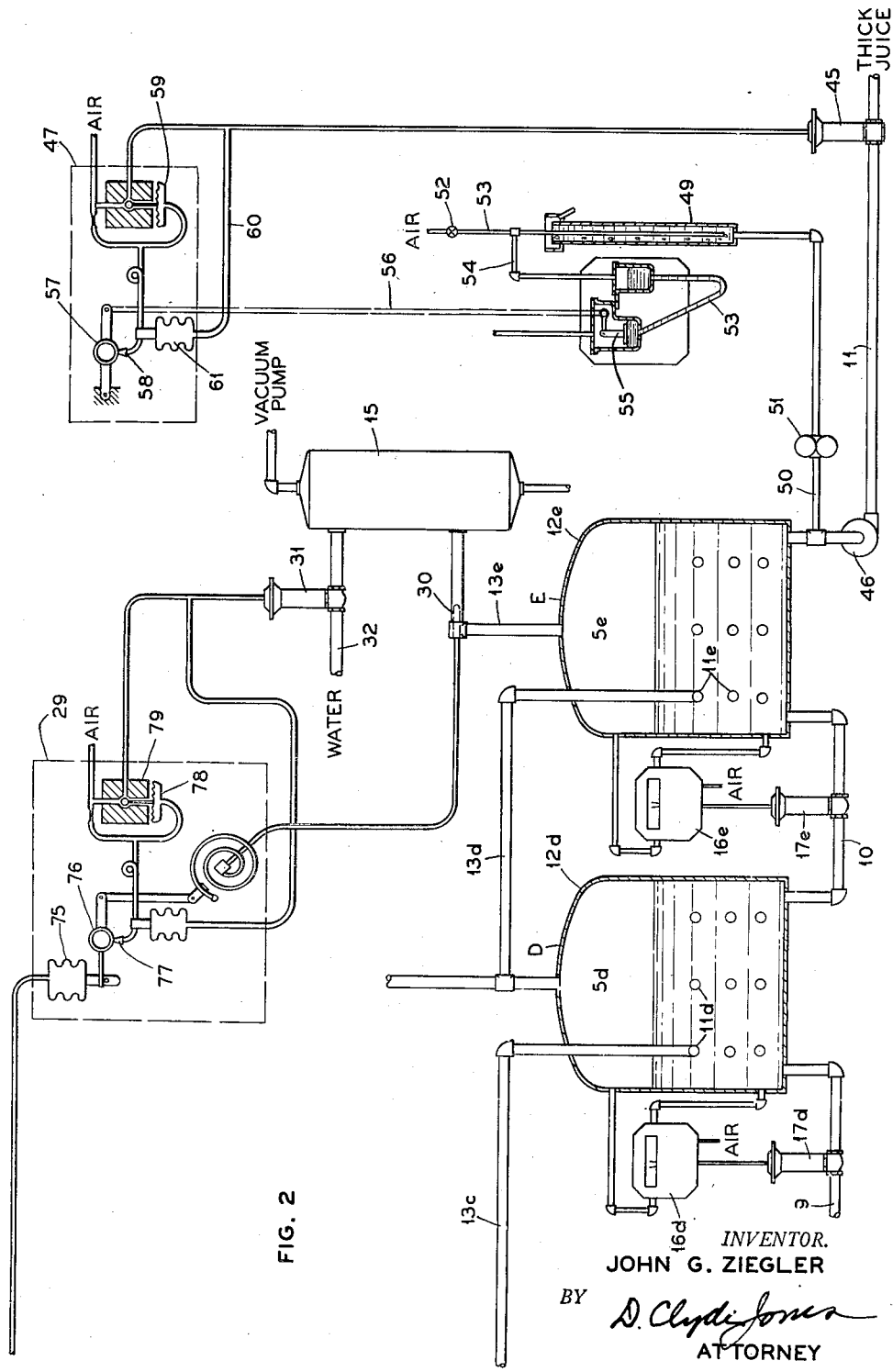

The invention will best be understood by reference to the drawings in which Figs. 1 and 2, when placed end to end in the order named, diagrammatically illustrate a multi-effect sugar evaporator provided with novel control mechanisms of the present invention by which the present novel method can be practised.

Referring especially to Figs. 1 and 2, the reference characters A, B, C, D, and E respectively designate evaporator units of a conventional series-connected, multi-unit or multi-effect evaporator. The several units are substantially alike so that a description of unit A will be sufficient, it being understood that the corresponding parts of the several units will be identified by the same numerals but with different postscripts. The unit A comprises a receptacle such as 5a having an inlet and an outlet, the inlet of unit A being connected by a supply pipe 6, with pump P therein, to a tank T of juice or the like. The juice outlet of unit A is connected to the inlet of unit B by a juice supply pipe 7. Similarly, the juice supply pipe 8 connects the units B and C, while the juice supply pipe 9 connects the units C and D, and supply pipe 10 connects the units D and E. The juice outlet of unit E communicates with outlet pipe 11.

The level of the juice in the tank T depends upon the rate at which the juice is supplied thereto and also upon the rate at which it is drawn off as evaporation takes place. This level is measured by a level controller 18. Any one of the standard methods of measuring the quantity of a liquid in a container can be used, such as by weighing, by using a float, or the like. However, the method illustrated in Fig. 1 comprises an open-ended pipe 19 which is supplied through restriction 22a with compressed air under uniform pressure, the pipe discharging near the bottom of the tank T. The pressure required to force the juice out of the lower end of the pipe 19 and still keep a small stream of air bubbles discharging from that end, is used to operate the Bourdon spring and related parts of the controller 18 to indicate the level of liquid in the tank.

The receptacle 5a is provided with a heater 11a and has a dome-shaped top 12a communicating with a vapor discharge pipe 13a and its branch 13aa leading to a utilizing load (not shown). The heater 11a of the first unit is supplied with steam which is introduced through a steam supply pipe 14, to boil the juice contained in this unit. The vapors given off from the boiling juice, which is being concentrated in unit A, discharge through the pipe 13aa and branch pipe 13a to the utilization load and also into the heater 11b of the second unit B where the heat in this vapor causes the juice in this second unit to boil without the introduction of further heat therein. Similarly, the hot vapors from the unit B are discharged through pipe 13b and branch pipe 13bb to a second utilization load and also into the heater 11c of unit C and the heated vapors from this unit are discharged through pipe 13c and branch pipe 13cc to a third utilization load and into the heater 11d of unit D. The hot vapors from the unit D are introduced in the heater 11e of unit E. It will thus be understood that the hot vapors from each unit, except the last, namely unit E are introduced into the heater of the next succeeding unit. However, the discharge pipe 13e of the last unit of the series is connected through a condenser 15, to a vacuum pump (not shown), so that a pressure substantially below atmospheric pressure is maintained in the unit E. Thus the heated vapor discharged by the unit D through the pipe 13d into the heater within the unit E, causes the juice in this unit to boil at a reduced temperature. As the heat of the vapor supplied through the pipe 13d is surrendered through the heater into the juice within the unit E, the vapor in this heater condenses and therefore reduces the pressure in the top of the unit D. The unit D will thereby have a reduced pressure therein with respect to atmospheric pressure but higher than the pressure in the unit E. With this reduced pressure in unit D, the heated vapor discharged into its heating coil from the unit C through pipe 13c will cause the juice in the unit D to boil and, as this vapor surrenders its heat it develops a reduced pressure in the unit C, as compared with the atmospheric pressure. The reduced pressure in unit C enables the hot vapor supplied through pipe 13b to the heater of this unit, to cause the juice therein to boil. As the vapor supplied through the pipe 13b surrenders its heat, it contracts and develops a reduced pressure with respect to atmospheric pressure, in the top of the unit B. The juice in unit B will therefore boil at a lower boiling point than if the solution were subjected to atmospheric pressure. In like manner the juice in unit A will have a reduced boiling point due to subatmospheric pressure to which it is subjected. Thus by the arrangement just described, steam is supplied only to the heater of the unit A while the vacuum pump (not shown) is connected only to the condenser 15 related to the unit E, the last unit of the series, but each succeeding unit of the series will be heated by the vapor from the preceding unit and each succeeding unit of the series will have a higher degree of vacuum therein due to the condensation of the vapor which it supplies to the succeeding heater. It will be understood that the heater of each unit communicates with a suitable steam trap (not shown) so that all condensate is discharged from the heating coil.

It has been found that the individual units of a multi-unit evaporator operate most efficiently if the solution therein is maintained at a predetermined level. Accordingly there are provided conventional air-operated automatic liquid level controllers 16a, 16b, 16c, 16d and 16e on the units A, B, C, D, and E. The level controller 16a on the unit A controls the opening of the valve 17a in the supply pipe 6 through which the pump P pumps the juice from tank T into the unit A. Similarly, the level controllers 16b, 16c, 16d and 16e respectively control valve 17b in supply pipe 7, the valve 17c in supply pipe 8, the valve 17d in the supply pipe 9 and the valve 17e in the supply pipe 10. Thus, when the liquid in a given unit drops below the predetermined level, its liquid level controller will open the valve in its supply line from the preceding unit in order to restore the desired level. Of course, when some of the liquid in the preceding unit is thus discharged, its liquid level controller will operate to open the valve in the supply line from the next preceding unit in the series. In this way, when liquid is discharged from the last unit in the series, such as E, its liquid level controller will open the valve 17e in the supply pipe leading from unit D to unit E to lower the level in the unit D, and this is repeated through the series of the units until a sufficient supply of liquid is introduced into these units to make up for that discharged from the unit E.

The amount of steam supplied through pipe 14 to the first evaporator unit A, is regulated by a pneumatically operated pressure controller 20. This controller is responsive to a deviation in pressure in the outlet steam pipe 13aa from the evaporator A and adjusts the valve 21 in the supply steam line 14 to admit the desired amount of steam therethrough. The controller 20, by adjusting the valve 21, maintains the pressure in the outlet pipe 13aa constant while the quantity of steam required from the main supply line 14 is really determined by the amount of low pressure steam drawn from the unit A through the branch pipe 13aa and through pipe 13a to unit B.

The amount of low pressure steam supplied to the second unit B is controlled by a pressure controller 24 which is similarly responsive to steam pressure in the outlet steam pipe 13bb from the second evaporator B, and acts to adjust the valve 25 in the output steam line 13a from the first evaporator A. Likewise, the amount of steam drawn from the pipe 13bb from the second evaporator B to supply the third evaporator C is controlled by pressure controller 27 which is responsive to the steam pressure in the outlet steam pipe 13cc from the third evaporator C and acts to adjust the valve 28 in the line 13b from the output of the second evaporator B. If low pressure steam from the third evaporator is not needed for other processes, the controller 27 and its controlled valve 28 can be omitted.

The output steam pressure from the fourth evaporator D may or may not be controlled depending upon whether the steam therefrom can be used for other processes. The output steam from the fifth evaporator E discharges into condenser 15 as mentioned so that the air which has been unavoidably or purposely introduced into the system is removed by the vacuum pump (not shown). The condenser and pump maintain a low pressure on the juice in the fifth evaporator E. Any of the familiar types of condenser used in steam plants can be used, such as the tubular type or the spray type. The pressure prevailing in evaporator E, and therefore the rate of evaporation effected in this evaporator, is controlled by a pressure controller 29. This controller has its pressure responsive connection 30 coupled into the output pipe 13e and operates on a valve 31 governing the flow of water through the water line 32 into the condenser 15. The control of the water flow into the condenser, provides an effective way in which the evaporating rate in unit E is increased or decreased.

The discharge of thick juice of a predetermined density through pipe 11 is effected by pump 46 as governed by the amount of opening of the valve 45 of a specific gravity controller 47 of the throttling type.

The means for determining the specific gravity includes a glass tube 49 which is continuously filled with a sample of thick juice supplied from this outlet of evaporator E by means of pipe 50 and pump 51. Air from a uniform pressure source is supplied through restriction 52 and pipe 53' leading to the bottom of tube 49 where the escaping air, bubbles up through the sample of juice. The tube 49 is made of transparent material so that the rate at which the air, bubbles up through the liquid, can be observed. As long as the air bubbles up slowly, the pressure of the air at the lower end of the tube is equal to the pressure of the liquid at that point. The restriction 52 is used to control the flow of the air so that the bubbles will form slowly. Since the height of the liquid is controlled by the overflow, the pressure at the lower end of the pipe is a function of the density of the liquid. The varying resistance of the sample juice to the upward passage of these bubbles, is a measure of the specific gravity of the juice. If, for example, the specific gravity has increased, the back pressure of the air applied through pipe 54 to the sealed right arm of the manometer tube 53 is increased. This raises the level of the liquid in the left arm of the tube 53. As the level rises the float 55 also rises, thereby elevating rod 56. The elevation of rod 56 increases the space relation between the baffle 57 and nozzle 58. This reduces the back pressure at the nozzle so that the relay valve 59 tends to open. As the valve opens, greater air pressure is supplied to the top of valve 45 to open it. The output pressure of the relay valve 59 is also applied through branch pipe 60 to bellows 61 which acts to reduce the amount of the change in the space relation between the baffle and nozzle thereby providing throttling control.

The amount of steam supplied to the first evaporator A by the valve 21 depends upon the demand for low pressure steam from the various evaporators A, B, C, D and E, including the steam supplied to other processes or loads through pipe 13aa, 13bb, and 13cc. In order to supply the required amount of low pressure steam, it is essential that the supply of juice be sufficient to yield the necessary water to supply the required steam. To provide extra water in case the supply of juice is insufficient, a water pipe 62, controlled by valve 65 of the level controller 18, is used to supplement the juice in the storage tank T.

At the beginning of operations, when the level of the juice in the tank T is low, the pressure in the tube 19 is also low. Consequently the output pressure in pipe 40 of controller 18 is high, and operates on the reverse acting booster relay valve 41 to increase the pressure on valve 65 to open it and supply water through pipe 62, to the tank T. This water is pumped from the tank into the first evaporator and in turn passes to the remaining evaporators until the level in each is brought up to the predetermined value so that the supply valves 17a, 17b, 17c, 17d, and 17e are closed by the level controllers 16a, 16b, 16c, 16d, and 16e.

While the level in the supply tank T is rising, the pressure controller 20, which tends to maintain the desired steam pressure in pipe 13aa, operates valve 21 to admit steam into the evaporator A. The water in evaporator A is thereby heated until some of it evaporates to supply steam to other processes through pipe 13aa and through pipe 13a to the heater 11b of the second evaporator B under the control of valve 25. The pressure in evaporator A increases until it reaches the value set by recorder-controller 20. Steam supplied from the first evaporator A to the heater 11b of the evaporating unit B, increases the evaporation rate in unit B with a consequent increase in steam pressure in pipes 13b and 13bb to a value eventually determined by controller 24 and its valve 25. Likewise, the steam introduced through pipe 13b to heater 11c raises the pressure in the third evaporator to a predetermined value. The steam output from the third evaporator C to the heater 11d increases the evaporating rate in the fourth evaporator D tending to raise the steam pressure therein. The steam pressure in evaporator D and in evaporator unit E is determined by the controller 29 as well as by the condenser 15 and by the vacuum pump (not shown).

As juice is added to the storage tank T, it replaces the water therein at which time the controller 18 closes valve 65 to shut off the supply of water to the storage tank T.

When the juice level in the tank T rises beyond a given point, this indicates that the juice supply has exceeded the ability of the evaporators, acting at the normal rate, to remove sufficient water to raise the density of the juice to a predetermined value. Since the specific gravity controller 47 is adjusted to open its valve 45 in response to a juice density in excess of a given value, the juice cannot be discharged through valve 45 at an increased rate without additional adjustment. Under such conditions, when the supply of juice increases beyond the normal capacity of the system to handle it, the level of this juice in tank T will rise above a predetermined level. In response to this abnormal level, the level controller 18 will operate to increase the rate of evaporation in the several evaporating units. This is brought about by the increased back pressure in pipe 19 when the juice rises above the predetermined value, and is effective to change the set point of the controller 29 to lower the pressure in the evaporator unit E. The changing of the set point of the controller is effected in the following manner. When the back pressure in the pipe 19 increases, due to the air being bubbled through a greater column of juice, the Bourdon spring 69 tends to unwind in response to the increased back pressure. This tends to move the baffle 70 nearer to the nozzle 71. As a result of this movement, the back pressure in the nozzle is increased which expands the capsular diaphragm 72 tending to close the relay valve 73. This reduces the air pressure in the pipes 40 and 74, the pressure in the pipe 40 operating to position the relay valve 41 to decrease the pressure on valve 65 so that the valve 65 in the water-line is closed. The reduced pressure in the pipe 74 tends to cause the bellows 75 to contract and thereby elevates the left end of the baffle 76 with respect to its nozzle 77. The separation of the baffle and nozzle lowers the back pressure in the capsular diaphragm 78. This action tends to open the relay valve 79 and thereby apply increased air pressure to the motor valve 31 in the water supply line. The valve 31 tends to open thereby supplying an increased amount of cooling water to the condenser which in turn reduces the pressure in the evaporating unit E. The evaporating rate in this unit is thus increased and in turn the evaporating rate in the other units is increased so that a greater throughput of juice is effected.

What I claim is:

1. In a juice evaporating system, a heated multi-unit evaporator, a juice tank connected to said evaporator for supplying juice thereto, means for supplying juice to the tank, a specific gravity controller governing the discharge of concentrated juice from the last unit of the evaporator in accordance with the specific gravity of the juice leaving the last unit, a utilization load apart from said evaporator, conduit means for discharging heated vapor from at least one of said units to said utilization load, means for regulating the heat supplied to said evaporator in accordance with the pressure in said conduit means, a source of water, means operatively connected to said tank and responsive to predetermined minimum quantity of juice in said tank for delivering a controlled amount of water thereto from said source whereby the heated vapor supply is continued at the predetermined pressure.

2. In a juice evaporating system, a heated multi-unit evaporator including pressure reducing mechanism for changing the rate of evaporation effected therein, a utilization load apart from said evaporator, means for discharging heated vapor at a predetermined pressure from at least one of said units to said utilization load, means including a tank for supplying juice continuously to said evaporator, a pressure controller operatively connected to said mechanism for governing in accordance with a given setting, the rate of evaporation effected in said evaporator, a device for sensing the level of juice in said tank, and means controlled by said device and responsive to a predetermined high level as sensed thereby for changing the setting of said pressure controller whereby the rate of evaporation effected in said evaporator is increased in response to an abnormally large supply of juice, a source of water, and means controlled by said device and responsive to a predetermined low level of juice in said tank as sensed by said device for adding water to said juice from said source, whereby vapor at the predetermined pressure will continue to be supplied to said utilization load.

JOHN G. ZIEGLER.

REFERENCES CITED

The following references are of record in the file of this patent:

UNITED STATES PATENTS

| Number | Name | Date |
| --- | --- | --- |
| 378,843 | Lillie | Feb. 28, 1888 |
| 559,857 | Lillie | May 12, 1896 |
| 1,033,559 | Dunn | July 23, 1912 |
| 1,387,475 | DeBaufre | Aug. 16, 1921 |
| 1,390,677 | DeBaufre | Sept. 13, 1921 |
| 1,986,334 | Gearing et al. | Jan. 1, 1935 |
| 2,040,284 | Tell | May 12, 1936 |
| 2,073,825 | Beck et al. | Mar. 16, 1937 |
| 2,315,683 | Ziegler | Apr. 6, 1943 |
| 2,440,173 | Henszey | Apr. 20, 1948 |
| 2,441,361 | Kirgan | May 11, 1948 |